United States Patent
Cheswick

(10) Patent No.: US 7,813,344 B2
(45) Date of Patent: Oct. 12, 2010

(54) END USER CIRCUIT DIVERSITY AUDITING METHODS

(75) Inventor: William Cheswick, Bernardeville, NJ (US)

(73) Assignee: AT&T Intellectual Property I, LP, Reno, NV (US)

(*) Notice: Subject to any disclaimer, the term of this patent is extended or adjusted under 35 U.S.C. 154(b) by 194 days.

(21) Appl. No.: 12/337,039

(22) Filed: Dec. 17, 2008

(65) Prior Publication Data

US 2010/0150153 A1   Jun. 17, 2010

(51) Int. Cl.
*H04L 12/28* (2006.01)
*G01R 31/08* (2006.01)

(52) U.S. Cl. .................. 370/389; 370/230; 370/235

(58) Field of Classification Search .............. None
See application file for complete search history.

(56) References Cited

U.S. PATENT DOCUMENTS

| | | | | |
|---|---|---|---|---|
| 5,455,865 A * | 10/1995 | Perlman | ............ | 713/153 |
| 5,467,345 A * | 11/1995 | Cutler et al. | ............ | 370/229 |
| 6,079,020 A * | 6/2000 | Liu | ............ | 726/15 |
| 6,363,478 B1 * | 3/2002 | Lambert et al. | ............ | 713/151 |
| 7,149,897 B2 * | 12/2006 | Chincheck et al. | ............ | 713/166 |
| 7,173,905 B1 * | 2/2007 | Alex et al. | ............ | 370/230 |
| 7,325,058 B1 * | 1/2008 | Sheth et al. | ............ | 709/225 |
| 2001/0026553 A1 * | 10/2001 | Gallant et al. | ............ | 370/395 |
| 2002/0141369 A1 * | 10/2002 | Perras | ............ | 370/338 |
| 2003/0133411 A1 * | 7/2003 | Ise et al. | ............ | 370/230 |
| 2004/0073694 A1 * | 4/2004 | Frank et al. | ............ | 709/232 |
| 2006/0209836 A1 * | 9/2006 | Ke et al. | ............ | 370/392 |
| 2006/0239254 A1 * | 10/2006 | Short et al. | ............ | 370/352 |
| 2008/0279110 A1 * | 11/2008 | Hart et al. | ............ | 370/248 |
| 2008/0310437 A1 * | 12/2008 | Cheng et al. | ............ | 370/404 |
| 2009/0089358 A1 * | 4/2009 | Beckwith et al. | ............ | 709/201 |
| 2009/0262745 A1 * | 10/2009 | Leong et al. | ............ | 370/396 |
| 2010/0034383 A1 * | 2/2010 | Turk | ............ | 380/262 |
| 2010/0150049 A1 * | 6/2010 | Kim et al. | ............ | 370/312 |

OTHER PUBLICATIONS

Gianvecchio et al, Detecting covert timing channels: An entropy-based approach, 2007, CCS, pp. 1-10.*
Shah et al., *Keyboards and Covert Channels*, Security '06: 15th USENIX Security Symposium.

* cited by examiner

*Primary Examiner*—Pankaj Kumar
*Assistant Examiner*—Hicham B Foud
(74) *Attorney, Agent, or Firm*—Myers Bigel Sibley & Sajovec, P.A.

(57) ABSTRACT

A communications network circuit through which data packets are flowing is identified by detecting a first message data packet inserted into the data packet flow by a user, and determining an endpoint destination address of the detected data packet. The circuit using the endpoint destination address is identified and a second message data packet containing the circuit identification information is sent to the destination address. A covert timing channel may be created, and one or more data packets containing circuit identification information may be sent through the covert channel.

8 Claims, 4 Drawing Sheets

END USER CIRCUIT DIVERSITY AUDITING METHODS

BACKGROUND

The present application relates generally to communications networks, and more particularly, to communications network circuits.

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the world wide web (web) service facility, which is a client/server-based facility that includes a large number of servers (computers connected to the Internet) on which web pages, applications and/or files reside, as well as clients (web browsers), which interface users with the remote servers. The topology of the web can be described as a network of networks, with providers of network services called Network Service Providers, or NSPs, or Internet Service Providers (ISPs). Servers that provide application-layer services may be referred to as Application Service Providers (ASPs). Sometimes a single service provider provides both functions. As used herein, the term Service Provider (SP) includes, but is not limited to, NSPs, ASPs, and ISPs.

Communications networks include many circuits. A circuit is a physical path between two or more points along which packets can be carried, and consists of one or more wires (or wireless paths) and possibly intermediate switching points. The term "circuit diversity" refers to the use of multiple communications circuits, each having a different physical path. When circuits utilize different physical paths, the cutting of communications lines in one circuit does not cause failure of service in other circuits. Circuit diversity has been considered a best practice for business continuity for the public and private sectors, as well as for the military, particularly since the Sep. 11, 2001 terrorist attacks in New York.

Many entities with critical missions establish service level agreements with SPs to insure circuit diversity in order to guarantee continuity of communications between endpoints. Circuit diversity, however, can change over time for various reasons, including user actions, technician errors, etc. Unfortunately, detecting a change in circuit diversity, particularly by a communications network user, may be difficult. The difficulty in detecting a change in circuit diversity may be exacerbated when a circuit involves multiple SPs.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Methods for allowing communications network users to audit circuit diversity are provided. In some embodiments, a method of identifying a communications network circuit through which user data packets are flowing includes detecting a first message data packet, such as an Internet Control Message Protocol (ICMP) packet, inserted into the data packet flow by the user, and determining an endpoint destination address of the detected data packet. The circuit using the endpoint destination address is identified and a second message data packet, such as an ICMP packet, containing the circuit identification information is sent to the destination address. In some embodiments, it is determined whether the circuit user is authorized to receive the circuit identification information before sending the second message data packet to the destination address. In some embodiments, the circuit identification information contained in the second message data packet is encrypted. Upon arriving at the destination address, the circuit identification information is decrypted, for example, by a service provider (SP) associated with the circuit.

In other embodiments, a method of identifying a communications network circuit through which user data packets are flowing includes creating a covert timing channel, and sending one or more data packets containing circuit identification information through the covert channel. A covert channel may be created by applying a timing signal to selected data packets flowing through the circuit. In addition, the circuit identification information within the one or more data packets may be encrypted.

In other embodiments, a method of identifying a communications network circuit through which user data packets are flowing includes applying an analog signal to the timing of data packets flowing through the circuit. The analog signal has a frequency that identifies the circuit. A fast Fourier transform is applied to data packet arrival times to identify the circuit.

Methods of providing users with circuit identification information, as described herein, may be desirable by various public and private entities including, but not limited to, financial institutions, federal, state and local governments and agencies, Homeland Security, the military, etc. Methods of identifying a communication circuit, as described herein, allow communications network users to verify that circuit diversity has not changed.

Other methods, apparatus and/or computer program products according to exemplary embodiments will be or become apparent to one with skill in the art upon review of the following drawings and detailed description. It is intended that all such additional methods, apparatus and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
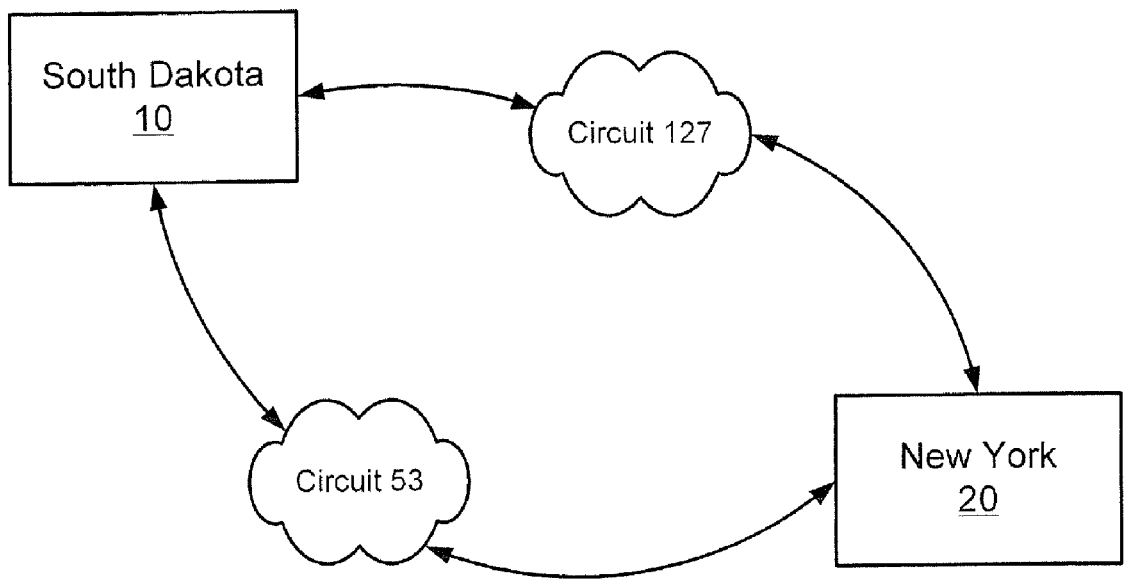
FIG. 1 is a block diagram that illustrates circuit diversity between two endpoints.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

The term "data packets", as used herein, refers to data packets of any protocol including, but not limited to, Internet Protocol (IP) data packets. Data packets in general are well understood by those skilled in the art, and need not be described further herein.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Futhermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Figure 2:
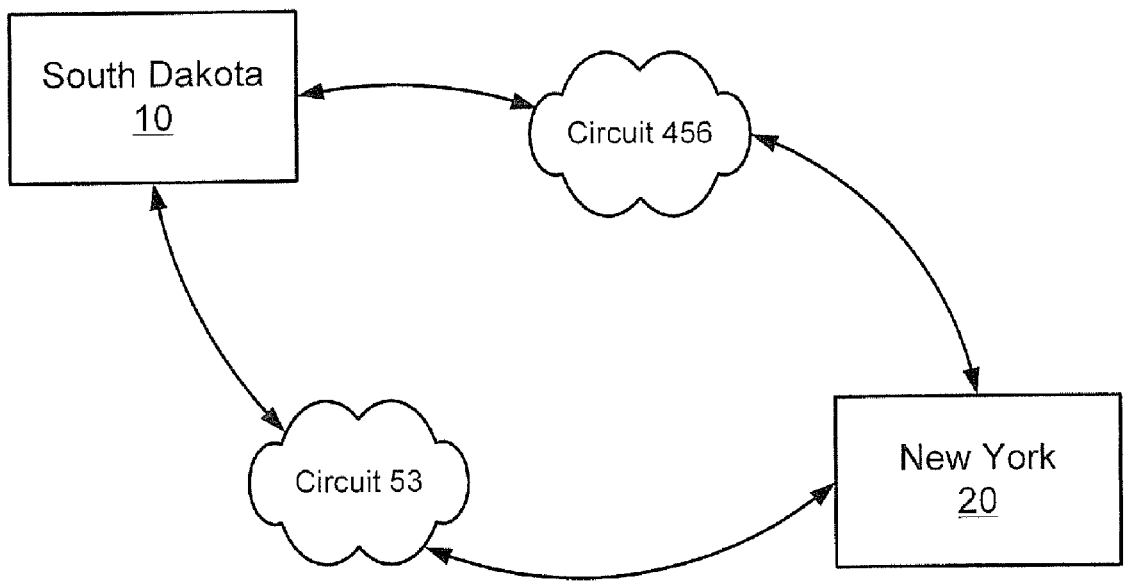
FIG. 2 is a block diagram that illustrates a change in circuits between the endpoints of FIG. 1.

FIGS. 1 and 2 illustrate an exemplary situation in which exemplary embodiments may be utilized by network users to audit circuit diversity. In FIG. 1, a network user has contracted with a SP to have two circuits (i.e., circuit diversity) between two endpoints, South Dakota 10 and New York 20. This circuit diversity is achieved by two circuits (circuit 127 and circuit 53), each having different physical paths. Moreover, the network user knows that these two identified circuits have different physical paths. In FIG. 2, an event has occurred that has caused circuit 127 to change to circuit 456. Such an event may be caused by various reasons including, but not limited to, user actions, network technician error, issues with multi protocol label switching (MPLS), etc. Circuit 456 may or may not have a physical path that is different from that of circuit 53. Currently, the network user is likely to be unaware that circuit 127 has changed to circuit 456. Embodiments described herein allow network users to become aware of circuit changes, and thereby initiate investigations as to whether circuit diversity has been breeched.

Figure 3:
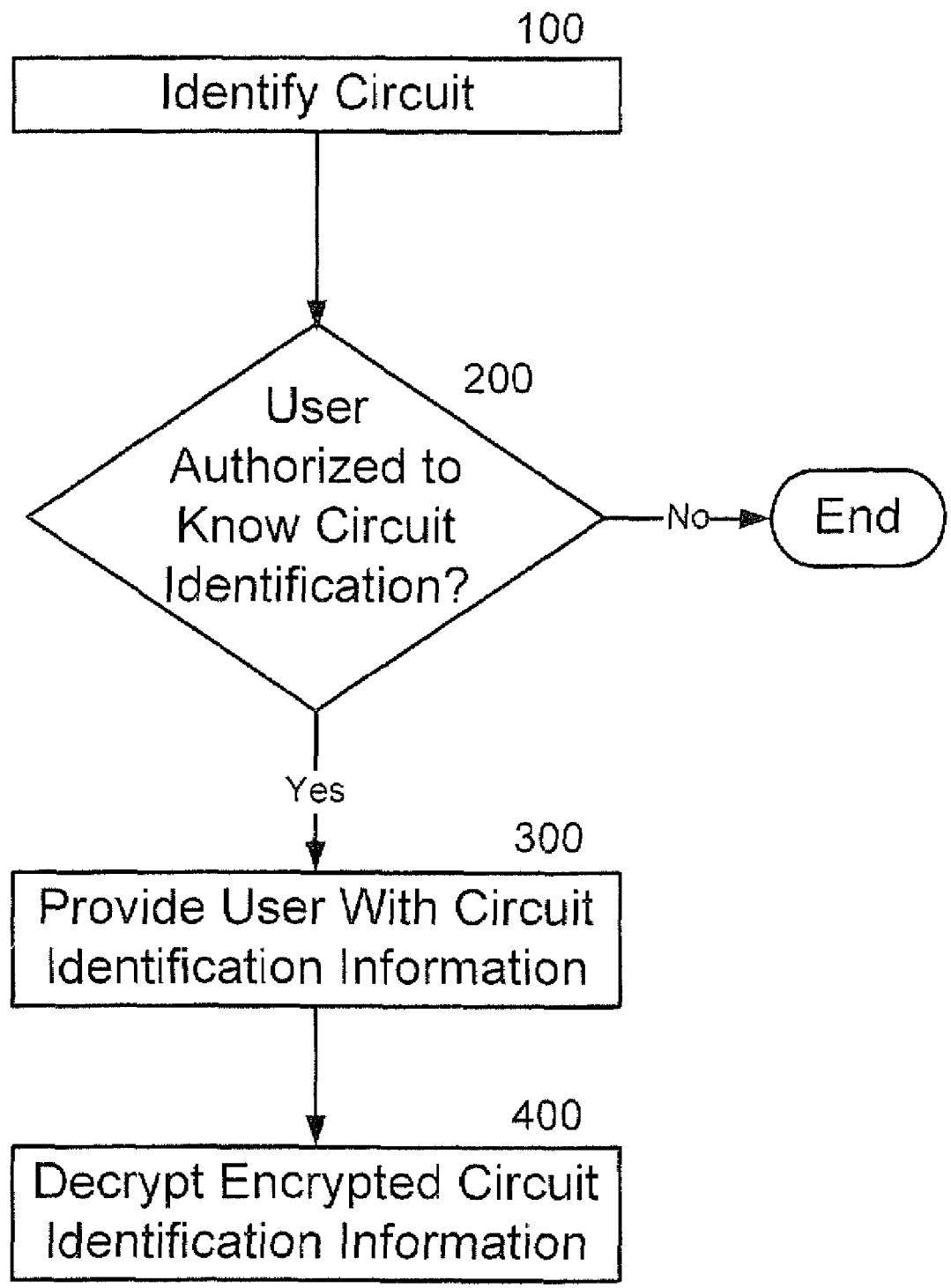
FIG. 3-6 are flow charts of operations for allowing network users audit circuit diversity, according to some embodiments.

Referring now to FIG. 3, operations for allowing network users to audit circuit diversity are illustrated. Initially, a circuit currently being used by a user is identified (Block 100). A circuit currently being used by a user means that data packets associated with a user (i.e., data packets associated with user client-server communications between circuit endpoints, etc.) are flowing through the circuit. Operations for identifying a currently used circuit are described further with respect to FIGS. 4-6. Continuing with FIG. 3, after a currently used circuit is identified (Block 100), a determination is made whether the user is authorized to receive the circuit identification information (Block 200). If the user is not authorized, the circuit identification information is not provided to the user. If the user is authorized, the circuit identification information is provided to the user (Block 300). If the circuit identification information is encrypted, for example by an SP, the encrypted circuit identification is decrypted (Block 400). Decryption may occur before providing the circuit identification information to an authorized user. However, in some embodiments, an authorized user may be provided with encrypted circuit identification information and the user attends to having the circuit identification information decrypted.

Figure 4:
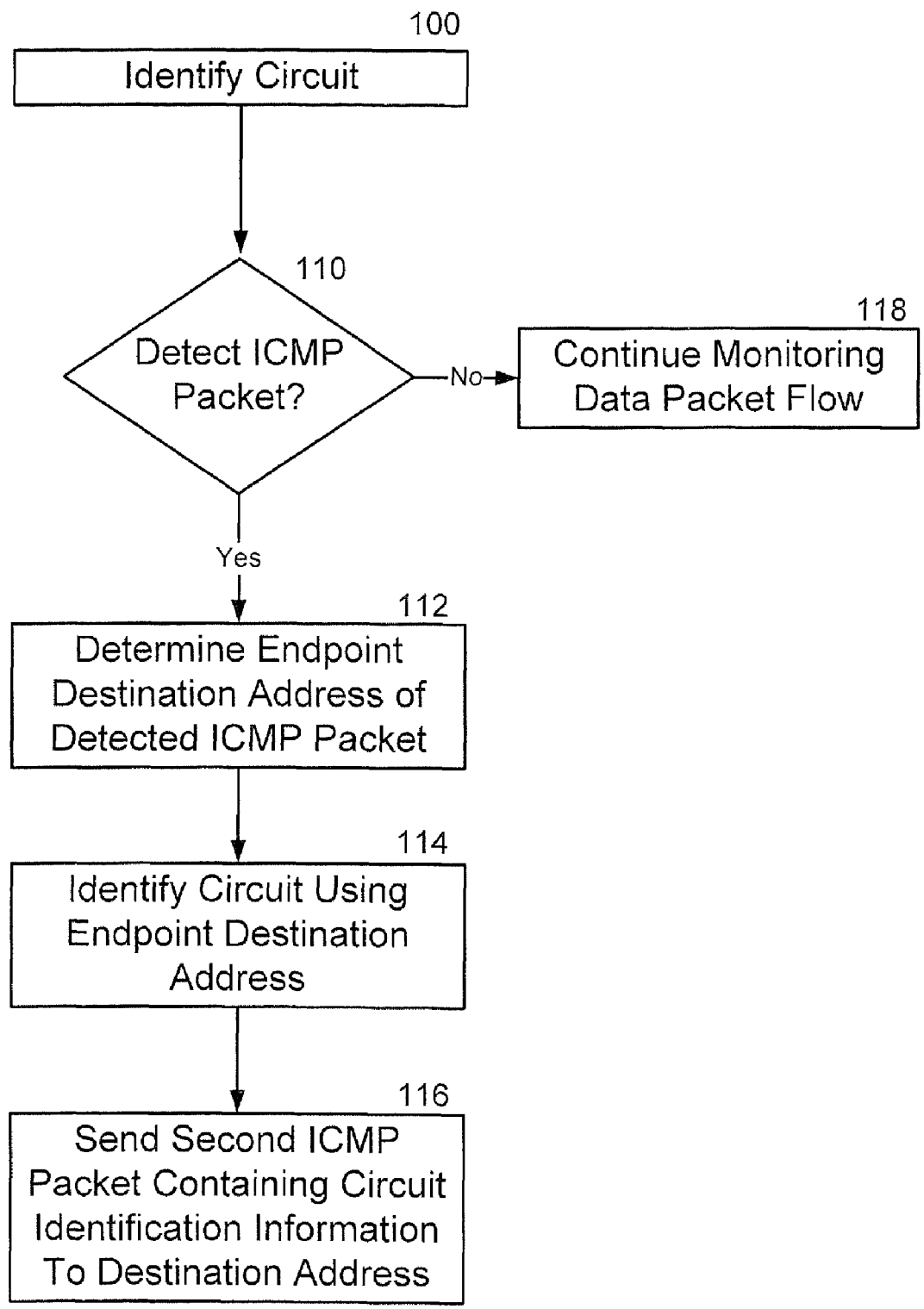

Referring to FIG. 4, operations for allowing a user to identify a communications network circuit through which the user's data packets are flowing (Block 100, FIG. 3), according to a first embodiment, are illustrated. A network device, such as, for example, a switch or a data packet sniffer, continuously monitors data packets flowing through a circuit, looking for message data packets. When the device detects a message data packet, such as an Internet Control Message Protocol (ICMP) packet, inserted into the data packet flow by a user (Block 110), the device reads data in the message packet to determine an endpoint destination address of the message packet (Block 112). Using the endpoint destination address, the circuit is identified (Block 114). The device then sends a second message packet, such as an ICMP packet, to the destination address (Block 116). The second message data packet contains the circuit identification information. The user obtains the circuit identification information at the endpoint destination address (e.g., S. Dak. 10 in FIG. 1) from the second message data packet.

In some embodiments, ICMP packets may be automatically issued at periodic intervals. In other embodiments, ICMP packets may be automatically issued after a certain amount of traffic flows through a circuit. In yet further embodiments, a network user could specify that a certain percentage of the user's traffic contain circuit identification packets. For example, 0.01% of the user's traffic could be these circuit packets that need no ICMP packet stimulation.

In some embodiments, a determination is made as to whether the user is authorized to receive the circuit identification information (Block 200, FIG. 3) prior to sending the second message data packet to the destination address (Block 116).

The circuit identification information contained in the second message data packet may be encrypted. In some embodiments, a mechanism for decrypting the encrypted circuit identification information (Block 400, FIG. 3) may be provided at the destination address. In other embodiments, an SP associated with the circuit may be requested to decrypt the circuit identification information (Block 400, FIG. 3) at the destination address.

Figure 5:
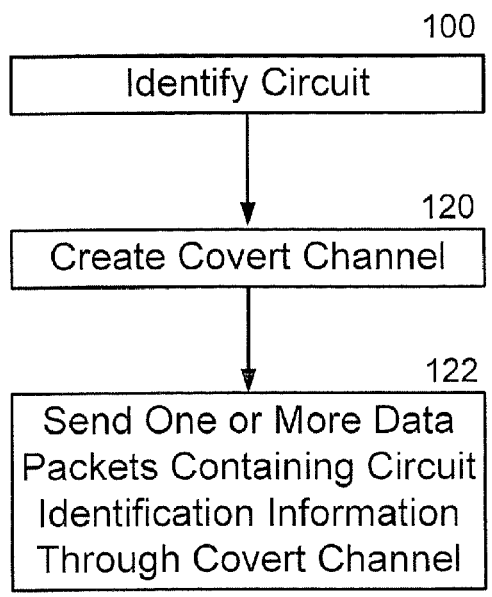

Referring to FIG. 5, operations for allowing a user to identify a communications network circuit through which the user's data packets are flowing (Block 100, FIG. 3), according to a second embodiment, are illustrated. A communications network SP creates a covert timing channel (Block 120), for example, by applying a timing signal to the data packets, and sends one or more data packets containing circuit identification information (encrypted or non-encrypted) through the covert channel (Block 122). Covert timing channels are described by Shah et al. in Keyboards and Covert Channels, Security '06; 15th USENIX Security Symposium, which is incorporated herein by reference in its entirety. An authorized user is allowed by the SP to view the data packets flowing in the covert channel that contain the circuit identification information. As known to those skilled in the art, a covert channel is a mechanism for sending and receiving information data between processors without alerting firewalls and other intrusion detection devices (IDSs) on a network. Covert channels may use ports that firewalls allow traffic through. In addition, data packets utilized in covert channels appear to be innocuous, for example, carrying ordinary information when, in fact, they conceal their actual data in one of the several control fields in the data packet headers.

Figure 6:
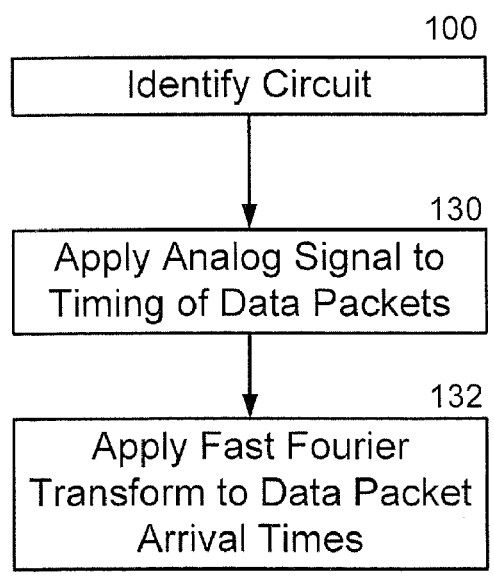

Referring to FIG. 6, operations for allowing a user to identify a communications network circuit through which the user's data packets are flowing (Block 100, FIG. 3), according to a third embodiment, are illustrated. A communications network SP applies an analog signal to the timing of data packets flowing through the circuit (Block 130). The analog signal has a frequency that identifies the circuit. A Fast Fourier Transform (FFT) is applied to data packet arrival times of data packets at a circuit end point to identify the circuit (Block 132).

Many variations and modifications can be made to the preferred embodiments without substantially departing from the principles of the present invention. All such variations and modifications are intended to be included herein within the scope of the present invention, as set forth in the following claims.

That which is claimed:

1. A method of identifying a communications network circuit through which data packets are flowing, the method comprising:
   detecting a first message data packet in the data packet flow, wherein the first message data packet is inserted into the data packet flow by a user;
   determining an endpoint destination address of the detected data packet;
   identifying the circuit using the endpoint destination address;
   determining if the circuit user is authorized to receive circuit identification information; and then
   sending a second message data packet to the destination address, wherein the second message data packet contains the circuit identification information.

2. The method of claim 1, wherein the circuit identification information contained in the second message data packet is encrypted, and the method further comprises decrypting the circuit identification information at the destination address.

3. The method of claim 2, further comprising requesting a service provider (SP) associated with the circuit to decrypt the circuit identification information at the destination address.

4. The method of claim 1, wherein the first and second message data packets are Internet Protocol (IP) packets.

5. The method of claim 4, wherein the first and second message data packets are Internet Control Message Protocol (ICMP) packets.

6. The method of claim 1, wherein the first message data packet is detected by a packet sniffer associated with the circuit.

7. A computer program product for identifying a communications network circuit through which user data packets are flowing, comprising a non-transitory computer readable storage medium having encoded thereon instructions that, when executed on a computer, cause the computer to:
- detect a first message data packet in the data packet flow, wherein the first message data packet is inserted into the data packet flow by a user;
- determine an endpoint destination address of the detected data packet;
- identify the circuit using the endpoint destination address;
- determine if the circuit user is authorized to receive the circuit identification information; and then
- send a second message data packet to the destination address, wherein the second message data packet contains the circuit identification information.

8. The computer program product of claim 7, wherein the computer readable storage medium has encoded thereon instructions that, when executed on a computer, causes the computer to decrypt encrypted circuit identification information contained in the second message data packet.

* * * * *